(12) United States Patent
Nakamura et al.

(10) Patent No.: US 8,085,984 B2
(45) Date of Patent: Dec. 27, 2011

(54) IMAGE RECOGNIZING APPARATUS AND METHOD, AND POSITION DETERMINING APPARATUS, VEHICLE CONTROLLING APPARATUS AND NAVIGATION APPARATUS USING THE IMAGE RECOGNIZING APPARATUS OR METHOD

(75) Inventors: Masaki Nakamura, Okazaki (JP); Takayuki Miyajima, Anjyo (JP); Motohiro Nakamura, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 945 days.

(21) Appl. No.: 11/793,008
(22) PCT Filed: Jan. 25, 2006
(86) PCT No.: PCT/JP2006/301611
  § 371 (c)(1),
  (2), (4) Date: Mar. 26, 2008
(87) PCT Pub. No.: WO2006/080547
  PCT Pub. Date: Aug. 3, 2006

(65) Prior Publication Data
  US 2008/0273757 A1    Nov. 6, 2008

(30) Foreign Application Priority Data
  Jan. 28, 2005 (JP) ................................. 2005-021339

(51) Int. Cl.
  *G06K 9/00* (2006.01)
(52) U.S. Cl. .................................................... 382/104
(58) Field of Classification Search .......... 382/103–104, 382/154; 340/436, 988, 995.25; 701/200, 701/207
  See application file for complete search history.

(56) References Cited

U.S. PATENT DOCUMENTS

| 6,560,529 B1 | 5/2003 | Janssen |
|---|---|---|
| 2001/0029428 A1 | 10/2001 | Huertgen et al. |
| 2003/0043030 A1 | 3/2003 | Kudo |

FOREIGN PATENT DOCUMENTS

| EP | 0738946 | * | 4/1995 |
|---|---|---|---|
| EP | 0 738 946 A1 | | 10/1996 |
| JP | A 2003-85562 | | 3/2003 |

OTHER PUBLICATIONS

Janssen, H. et al. "Vehicle Surround Sensing based on Information Fusion of Monocular Video and Digital Map," 2004 IEEE Intelligent Vehicles Symposium, University of Parma, Parma, Italy, pp. 244-249 (Jun. 14-17, 2004).

* cited by examiner

*Primary Examiner* — Anand Bhatnagar
*Assistant Examiner* — Amara Abdi
(74) *Attorney, Agent, or Firm* — Oliff & Berridge, PLC

(57) ABSTRACT

There is provided e.g. an image recognizing apparatus which can increase the recognition rate of the image of a recognition target even when the recognition rate in the image recognition operation would deteriorate otherwise due to inability of obtaining good image information on the recognition target, if the operation relied solely on picked up image information. The apparatus includes an image information obtaining section 3, an imaging position obtaining section 7, a land object information storing section 8, a land object information obtaining section 9 for obtaining, from the land object information storing section 8, the land object information on one or more land objects included within an imaging area of the image information, a determining section 15 for determining whether or not a plurality of recognition target land objects to be recognized are included within the imaging area of the image information, based on the obtained land object information and an image recognizing section 10 for recognizing an image of one recognition target land object, based on result of image recognition of another recognition target land object and on position relationship between the one recognition target land object and another recognition target land object based on the position information included in the land object information, if the determining section has determined that a plurality of recognition target land objects are included.

11 Claims, 8 Drawing Sheets

FIG.6
(a)
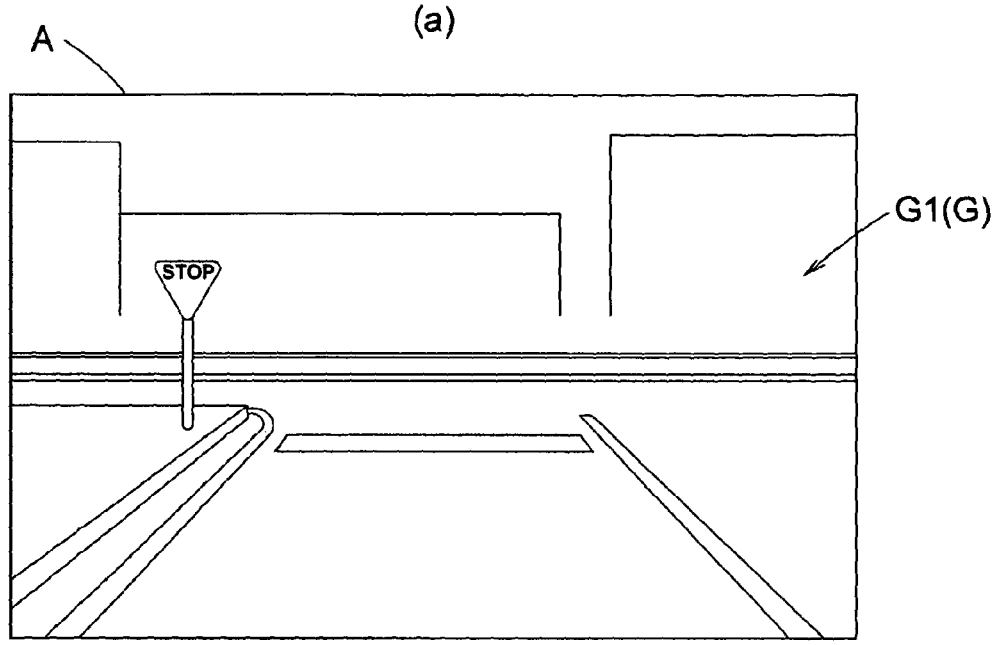
(b)
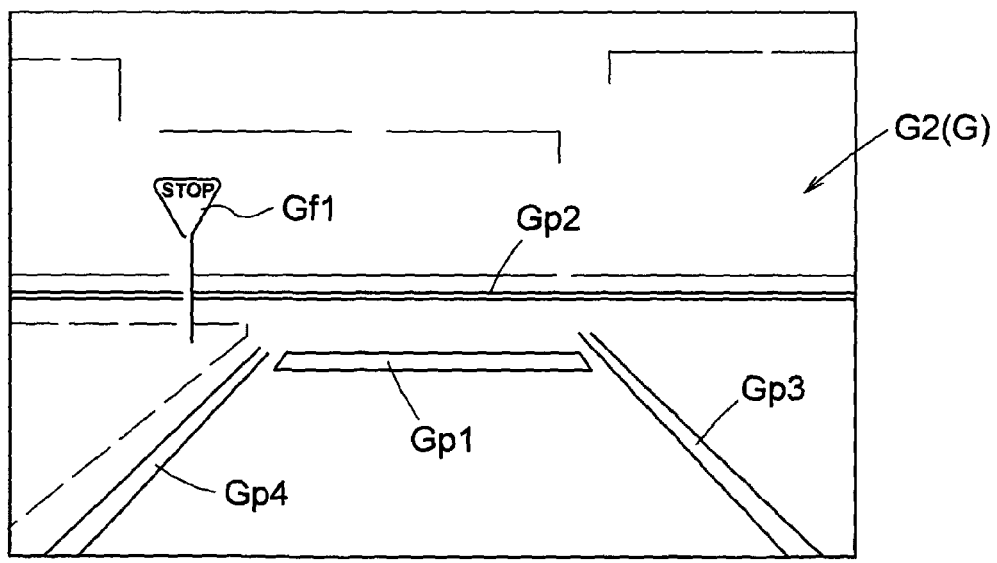

IMAGE RECOGNIZING APPARATUS AND METHOD, AND POSITION DETERMINING APPARATUS, VEHICLE CONTROLLING APPARATUS AND NAVIGATION APPARATUS USING THE IMAGE RECOGNIZING APPARATUS OR METHOD

TECHNICAL FIELD

The present invention relates to an image recognizing apparatus and method for use on board in e.g. a vehicle for recognizing an image of a predetermined recognition target land object included in image information obtained on a road. The invention relates also to a position determining apparatus, a vehicle controlling apparatus and a navigation apparatus using the image recognizing apparatus or method.

BACKGROUND ART

As a technique for recognizing an image of a predetermined recognition target land object included in image information obtained on a road, Patent Document 1 identified below discloses the following technique relating to a stop line recognizing apparatus. This stop line recognizing apparatus includes area brightness detecting means for detecting brightness of a set area which locates ahead or forwardly on a traveling road and extends longitudinally along the width of the traveling vehicle, time-series brightness change comparing means for comparing time-series change in brightness in the set area and a stop line determining means for determining presence/absence of a stop line based on the time-series brightness change detected in the set area. More particularly, a plurality of set areas are provided continuously along the vehicle width direction at a lower region in an original image inputted from a CCD camera. Then, if a mean brightness of any one of the plural set areas changes from low to high and then low again, the apparatus determines that a stop line exists.

The Patent Document 1 above further discloses a technique relating to a vehicle drive assisting system including, in addition to the stop line recognizing apparatus described above, three-dimensional object recognizing means for recognizing a three-dimensional object present forwardly on the traveling road, and alarm controlling means for issuing an alarm if the stop line recognizing apparatus has recognized a stop line and a three-dimensional object has been recognized immediately forwardly of (ahead of) that stop line. According to this vehicle drive assisting system, a pair of right and left stereo images obtained by a CCD camera having a stereoscopic optical system are processed to calculate three-dimensional distance distribution information over the entire images. Then, based on this distance distribution information, the system detects at a high speed three-dimension position data of e.g. a road geometry, a plurality of three-dimensional objects, etc. That is, by utilizing three-dimensional position information derived from the distance image, data relating to a white line present on the actual road is separated/extracted. On the other hand, parameters of a road model stored in advance in the system are changed or modified to suit the actual road geometry, thus recognizing the road geometry. Further, based on the detected road geometry, the system picks out data relating to an area upwardly of the road surface and eliminates noise contained in the distance image, thus extracting data of a three-dimensional object such as another vehicle traveling ahead, from the distance image. Moreover, the system divides the distance image by a predetermined interval into a grid of segments and makes a histogram for each grid segment, thus calculating the distance to the three-dimensional object. Then, based on distance data of the three-dimensional object for each segment, the contour image of the object is extracted and based on the dimensions of its shape and its position, the system recognizes e.g. the kind of the object.

[Patent Document 1]

Japanese Patent Application "Kokai" No. 2003-85562 (pages 2-4, FIGS. 1-3)

DISCLOSURE OF THE INVENTION

Problem to be Solved by Invention

The above-described technique effects an image recognition operation, based solely on image information obtained by an image pick-up apparatus such as a camera. Therefore, whether the image recognition can be effected correctly or not depends on the condition of the recognition target image included in the picked-up image information. For this reason, in case the recognition target image does not have e.g. any characteristic shape as is the case with an image of a stop line or a good image of the recognition target object cannot be obtained due to poor image pick-up conditions, for instance, recognition failure such as erroneous recognition, non-recognition will occur, thus resulting in reduction in the recognition rate.

Namely, according to the above-described technique, a stop line is set as the recognition target and if the mean brightness of any one of the plurality of set areas provided continuously along the vehicle width direction changes from low to high and then low again, this is determined as presence of a stop line. However, with such determining method, if there exists another painted marking elongate in the vehicle width direction, such another painted marking may also be erroneously recognized as a stop line. For example, a lateral line of a pedestrian crossing, a centerline of a T-shaped intersection, etc. are also such painted markings elongate in the vehicle width direction. Hence, such painted markings too can likely be recognized erroneously as a stop line.

Further, in the case of a stop line being a recognition target, if e.g. image information of the precise shape of the stop line cannot be obtained when e.g. there exists reflected light on a wet road surface or a portion of the stop line is fading but, recognition failure can occur again, thus resulting in reduction in the recognition rate.

The present invention has been made in view of the above-described problem. An object of the invention is to provide an image recognizing method and apparatus which can increase the recognition rate of the image of a recognition target even when the recognition rate in the image recognition operation would deteriorate otherwise due to inability of obtaining good image information on the recognition target if the operation relied solely on picked up image information. Further objects of the invention are to provide a position determining apparatus, a vehicle controlling apparatus and a navigation apparatus using such recognizing method or apparatus.

Means to Solve the Problem

For accomplishing the above-noted object, according to one aspect of the present invention, there is provided an image recognizing apparatus comprising: an image information obtaining section for inputting image information obtained on a road; an imaging position obtaining section for obtaining imaging position information of the image information; a land object information storing section for storing land object information including position information of a land object; a land object information obtaining section for obtaining, from the land object information storing section, the land object information on one or more land objects included within an imaging area of the image information, based on said imaging position information and position information included in said land object information; a determining section for determining whether or not a plurality of recognition target land objects to be recognized are included within the imaging area of the image information, based on said land object information obtained by said land object information obtaining section; and an image recognizing section for recognizing an image of one recognition target land object, based on result of image recognition of another recognition target land object and on position relationship between said one recognition target land object and said another recognition target land object based on the position information included in said land object information, if said determining section has determined that a plurality of recognition target land objects are included.

With the above-described characterizing feature, if a plurality of recognition target land objects to be recognized are included within the obtained image information, the image recognition of one recognition target land object included therein is carried out by utilizing the result of image recognition of another recognition target land object and on position relationship between said one recognition target land object and said another recognition target land object based on the land object information. Therefore, even if only a few characteristic features can be obtained from the image information for the one recognition target land object or good image information cannot be obtained therefor, it is still possible to improve the recognition rate of the image of the one recognition target land object while avoiding erroneous recognition.

In the above construction, preferably, when the determining section has determined that a plurality of recognition target land objects are included, said image recognizing section effects image recognition for the entire image information, compares result of this image recognition with said land object information obtained by said land object information obtaining section, then, based on success/failure of recognition of each one of the plural recognition target objects included within the imaging area of the image information, the image recognizing section sets an un-recognized land object as said one recognition target land object and a recognized land object as said another recognition target land object.

With the above, image recognition of one recognition target land object which has not been successfully recognized by the image recognition operation based solely on the image information is effected by utilizing result of image recognition on said another recognition target land object which has been successfully recognized as well as on the position relationship between said one recognition target land object and said another recognition target land object based on the image information. Therefore, it becomes possible to increase the image recognition rate also for a recognition target land object whose image recognition would be difficult if effected based on the image information alone.

Still preferably, said land object information includes correlation information for correlating land objects located adjacent each other; and when the land object information on said one recognition target land object includes correlation information for correlating to another land object information, said image recognizing section effects the image recognition of said one recognition target land object, with using preferentially result of image recognition on said another recognition target land object corresponding to said correlated another land object information. With inclusion of such correlation information as the land object information, another land object to be imaged within the imaging area of the image information in the proximity of one land object can be set or defined in advance in correlation with this one land object. And, when the image recognizing section is to effect image recognition of one image recognition land object, if a plurality of other recognition target land objects exist, then, the image recognizing section effects the image recognition of said one recognition target land object with using preferentially the result of image recognition on such correlated another recognition target land object. Therefore, the image recognition of one recognition target land object can be effected reliably with using the image recognition result on another recognition target land object suitable for the image recognition of the one recognition target land object.

Still preferably, said image recognizing section includes an area deducing section for deducing an area of said one recognition target land object being present within said image information based on the result of image recognition of said another recognition target land object and on said position relationship between said one recognition target land object and said another recognition target land object based on the position information included in said land object information, and said image recognizing section effects the image recognition of said one recognition target land object based on result of said deduction.

Namely, in case a plurality of recognition target land objects to be recognized are included within the obtained image information, even when image recognition of one recognition target land object is difficult, the area of this one recognition target land object being present within the image information can at least be deduced as long as image recognition on another recognition target land object is possible. This deduction is effected, based on the result of image recognition of said another recognition target land object and on said position relationship between said one recognition target land object and said another recognition target land object based on the position information included in said land object information. And, by effecting the image recognition of the one recognition target land object based on the deduction result, it is possible to improve the recognition rate of the image of the one recognition target land object while avoiding erroneous recognition.

In the above-described construction, the image recognizing section can be configured to effect the image recognition of said one recognition target land object, with adjusting a recognition (cognitive) algorithm such that a determination threshold for determining said one recognition target land object or not may be set lower within an area where an image of said one recognition target land object has been deduced to be present than within the other areas.

With the above, even if only a few characteristic features can be obtained from the image information for the one recognition target land object or good image information cannot be obtained therefor, it is still possible to improve the recognition rate of the image of the one recognition target land object while avoiding erroneous recognition.

Still preferably, said land object information includes one or both of shape information and coloring information on the land object and said image recognizing section effects the image recognition of the recognition target land object, with using one or both of the shape information and the coloring information on the land object. With this, the land object information can be obtained in such a manner as to be readily compared with the obtained image information. Further, the image recognizing section can effect the image recognition, based on one or both of the shape information and the coloring information included in this obtained land object information.

Still preferably, said land object information stored at said land object information storing section includes land object information on a painted marking provided on a road and land object information on a three-dimensional object provided along the road.

With the above, the image recognition can be effected on the combination of a two-dimensional painted marking provided on the road surface and a three-dimensional land object such as a traffic signpost, a traffic signal etc. provided along the road. Therefore, the recognition rate of the image of the recognition target land object can be even further improved.

According a further aspect of the present invention, there is provided a position determining apparatus comprising: the image recognizing apparatus described above, wherein the position determining apparatus determines the imaging position of the image information in greater details than the imaging position information obtained by the imaging position obtaining section, based on the result of the image recognition on the recognition target land object and the position information included in the land object information on each recognized recognition target land object.

With the above-described characterizing feature, the imaging position of the image information is determined based on the result of recognition by the image recognizing apparatus capable of recognizing a recognition target land object with such high recognition rate as described above and based also on the position information included in the land object information on each recognized recognition target land object. Therefore, the imaging position can be determined with even higher precision and in greater details.

According a still further aspect of the present invention, there is provided a vehicle controlling apparatus comprising: the image recognizing apparatus described above, wherein the vehicle controlling apparatus determines the imaging position of the image information in greater details than the imaging position information obtained by the imaging position obtaining section, based on the result of the image recognition on the recognition target land object and the position information included in the land object information on each recognized recognition target land object and then controls traveling of a vehicle, with using said determined imaging position as the current position of the vehicle.

With the above-described characterizing feature, the imaging position of the image information is determined based on the result of recognition by the image recognizing apparatus capable of recognizing a recognition target land object with such high recognition rate as described above and based also on the position information included in the land object information on each recognized recognition target land object. Therefore, the imaging position can be determined with even higher precision and in greater details. And, as the traveling control of the vehicle is effected, with using the determined imaging position as the current position of the vehicle, the traveling control for steering, accelerating/decelerating for such purpose as keeping a traffic lane or avoiding collision can be effected reliably.

According to a still further aspect of the present invention, there is provided a navigation apparatus comprising: the above-described image recognizing apparatus; a map information storing section storing map information; a self position displaying section for displaying a self position on a map obtained from said map information storing section, and a self position correcting section for determining the imaging position of the image information in greater details than the imaging position information obtained by the imaging position obtaining section, based on the result of the image recognition on the recognition target land object and the position information included in the land object information on each recognized recognition target land object and then correcting the self position to be displayed at the self position displaying section, based on said determined imaging position.

With the above-described characterizing feature, the imaging position of the image information is determined based on the result of recognition by the image recognizing apparatus capable of recognizing a recognition target land object with such high recognition rate as described above and based also on the position information included in the land object information on each recognized recognition target land object. Therefore, the imaging position can be determined with higher precision and in greater details. And, based on this image information determined in such details, the self position is corrected. This enables e.g. displaying of the self position in details. And, this enables also a route guiding to be effected at an appropriate timing, based on the information on the self position recognized in such great details.

According to a still further aspect of the present invention, there is provided an image recognizing method comprising: an image information obtaining step for inputting image information obtained on a road; an imaging position obtaining step for obtaining imaging position information of the image information; a land object information storing step for storing land object information including position information of a land object; a land object information obtaining step for obtaining, from the land object information storing step, the land object information on one or more land objects included within an imaging area of the image information, based on said imaging position information and position information included in said land object information; a determining step for determining whether or not a plurality of recognition target land objects to be recognized are included within the imaging area of the image information, based on said land object information obtained at said land object information obtaining step; and an image recognizing step for recognizing an image of one recognition target land object, based on result of image recognition of another recognition target land object and on position relationship between said one recognition target land object and said another recognition target land object based on the position information included in said land object information, if said determining step has determined that a plurality of recognition target land objects are included.

With the above-described characterizing feature, if a plurality of recognition target land objects to be recognized are included within the obtained image information, the image recognition of one recognition target land object included therein is carried out by utilizing the result of image recognition of another recognition target land object and on position relationship between said one recognition target land object and said another recognition target land object based on the land object information. Therefore, even if only a few characteristic features can be obtained from the image information for the one recognition target land information or good image information cannot be obtained therefor, it is possible to improve the recognition rate of the image of the one recognition target land object while avoiding erroneous recognition.

BEST MODE OF EMBODYING THE INVENTION

First Embodiment

A first embodiment of the present invention will be described next, with reference to the accompanying drawings.

Figure 1:
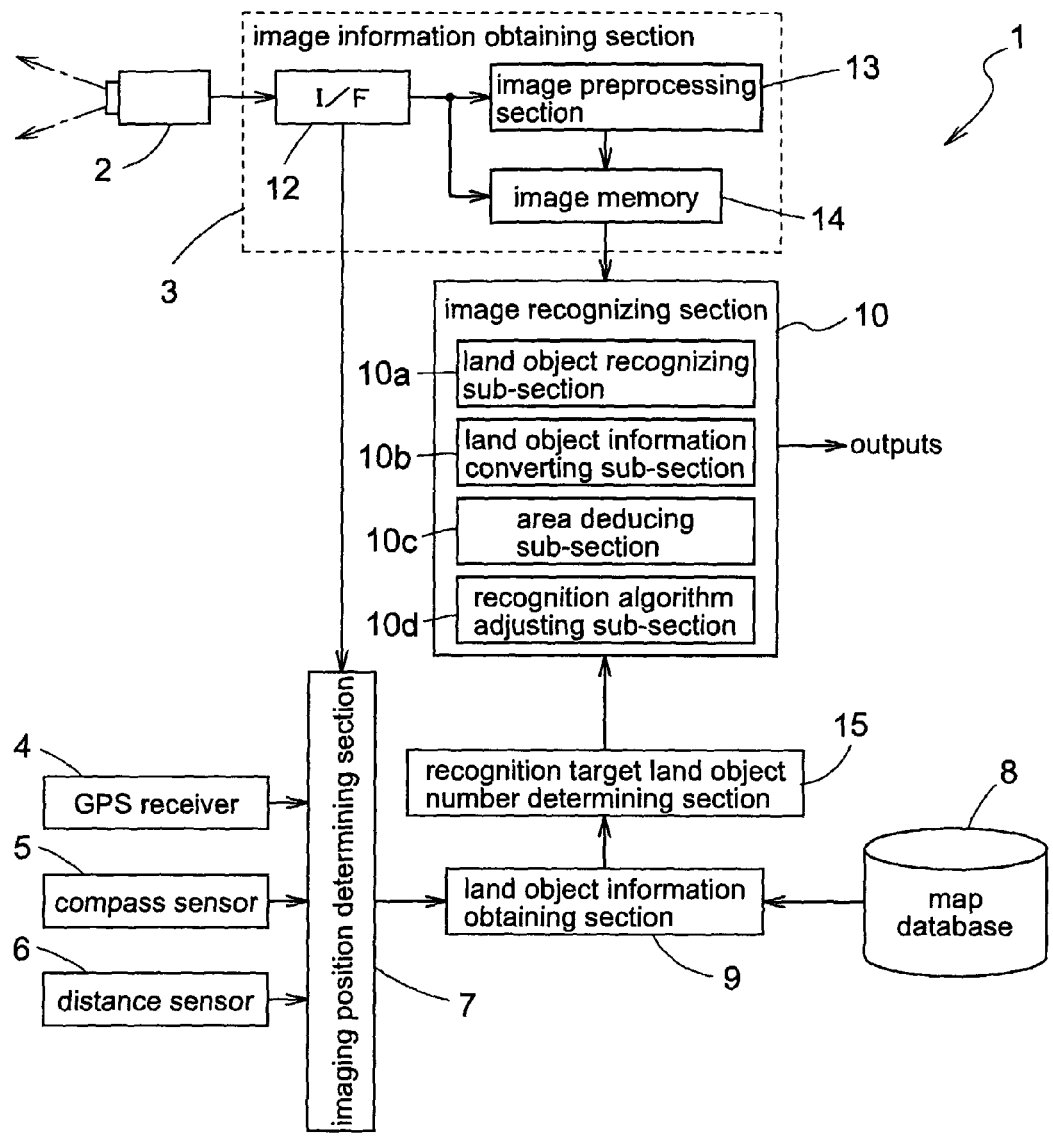
FIG. 1 is a block diagram showing a schematic construction of an image recognizing apparatus relating to a first embodiment of the present invention.
Figure 2:
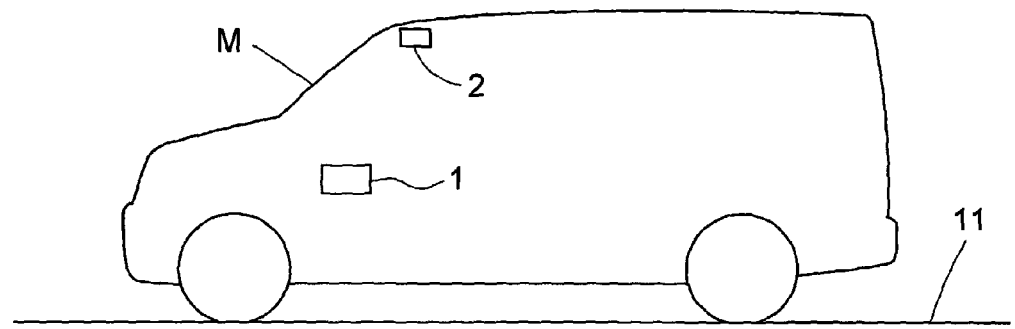
FIG. 2 is a view showing an example where the image recognizing apparatus relating to the above embodiment is mounted on board in a vehicle.

FIG. 1 is a block diagram showing a schematic construction of an image recognizing apparatus relating to this embodiment. In this embodiment, as shown in FIG. 2, the image recognizing apparatus of the invention is mounted on board in a vehicle M.

As shown in FIG. 1, the image recognizing apparatus relating to this embodiment includes, as principal components thereof, an image information obtaining section 3, an imaging position determining section 7, a map database 8, a land object information obtaining section 9, a recognition target land object number determining section 15 and an image recognizing section 10. The image information obtaining section 3 obtains or inputs image information G (see FIG. 6 (a)) from an image pick-up device 2 mounted on board in the vehicle M. The imaging position determining section 7 effects an operation for determining an imaging position by the image pick-up device 2, based on outputs from a GSP (Global Positioning System) receiver 4, a compass sensor 5, and a distance sensor 6. The map database 8 stores therein map information including land object information C (see FIG. 3). The land information obtaining section 9 obtains or inputs from the map database 8, the land object information C on one or more land objects included within an imaging area A (see FIG. 6 (a)) of the image information G. The recognition target land object number determining section 15 determines, based on the obtained land object information C, whether a plurality of recognition target land objects to be recognized are included within an imaging area A of the image information G. The image recognizing section 10 effects image recognition based on the image information G. Incidentally, in the following discussion of the present embodiment, the language: "land object information C" is intended to generically include various kinds of land object information exemplified by land object information Cp of painted markings, land object information Cf of three-dimensional objects to be described later.

As to the various functional components constituting this image recognizing apparatus 1, i.e. the imaging position determining section 7, the land object information obtaining section 9, the image recognizing section 10, the recognition target land object number determining section 15, etc., functional units thereof for effecting various operations on inputted data are realized in the form of hardware including an arithmetic processing unit such as a CPU as a core component thereof and/or software (program).

The image pick-up device 2 includes an imager such as a CCD sensor, CMOS sensor etc. and a lens assembly constituting an optical system for guiding light to the imager. The image pick-up device 2 is disposed e.g. to be oriented forwardly of the vehicle M as shown in FIG. 2, thereby picking up images of the surface of a road 11 on which the vehicle M is traveling and of its surrounding. Advantageously, such image pick-up device 2 can be an on-board camera or the like conventionally employed for obtaining an image around the vehicle M.

The image information obtaining section 3 includes an interface section 12 for connection to the image pick-up device 2, an image preprocessing section 13 for effecting various preprocessing operations on the image information G from the image pick-up device 2, and an image memory 14 for storing the image information G. The interface section 12 includes an analog/digital converter or the like. In operation, this interface section 12 inputs by a predetermined time interval the analog image information G obtained by the image pick-up device 2 and coverts this information into digital signals and outputs these signals to the image preprocessing section 13. The inputting time interval of the image information G by the interface section 12 can be from about 10 to 50 ms, for example. With this, the image information obtaining section 3 can obtain substantially continuously the image information of the road 11 on which the vehicle M is traveling. On this image information G, the image preprocessing section 13 effects various preprocessing operations for facilitating image recognition by the image recognizing section 10, e.g. a binarizing operation, an edge detecting operation, etc. And, the image information G after such preprocessing operations is stored in the image memory 14.

The interface section 12 outputs the image information G not only to the image preprocessing section 13, but also to the image memory 14 directly. Therefore, the image memory 14 stores both the image information G2 after the preprocessing operations by the image preprocessing section 13 and the un-preprocessed image information G1.

The imaging position determining section 7, in this particular embodiment, is connected to the GPS receiver 4, the compass sensor 5 and the distance sensor 6. The GPS receiver 4 is a device for receiving signals from a GPS satellite and obtains various information relating to the current location (latitude and longitude) of the GPS receiver 4, the moving speed, etc. The compass sensor 5 can be a geomagnetic sensor, a gyro sensor, or an optical rotation sensor or a rotary type resistance volume attached to a rotational portion of a steering wheel, or an angle sensor mounted to a vehicle wheel, and this sensor detects a traveling direction of the vehicle M. The distance sensor 6 can be a vehicle speed sensor for detecting revolution of a wheel, a combination of a yaw-G sensor and a circuit for integrating a detected acceleration two times, and this sensor detects a distance traveled by the vehicle M. And, based on these outputs from the GPS receiver 4, the compass sensor 5 and the distance sensor 6, the imaging position determining section 7 effects an operation for determining or identifying the current location of the image pick-up device 2. Incidentally, the position information obtained by the GPS receiver 4 generally includes an error of from 5 to 10 meter. Hence, the imaging position information of the image information G calculated by this imaging position determining section 7 also contains a certain amount of error.

The imaging position determining section 7 is connected also the interface section 12 of the image information obtaining section 3. This interface section 12 outputs signal to the imaging position determining section 7 as the timing of an image pick-up operation effected by the image pick-up device 2. Therefore, the imaging position determining section 7 calculates the position or location of the image pick-up device 2 at the timing of receipt of the signal from the interface section 12 and determines the imaging position of the image information G. The imaging position of the image information G thus determined by the imaging position determining section 7 is outputted to the land object information obtaining section 9 as imaging position information represented in terms of the latitude and longitude.

Hence, in the present embodiment, the GPS receiver 4, the compass sensor 5, the distance sensor 6 and the imaging position determining section 7 together constitute "the imaging position obtaining section" herein.

Figure 3:
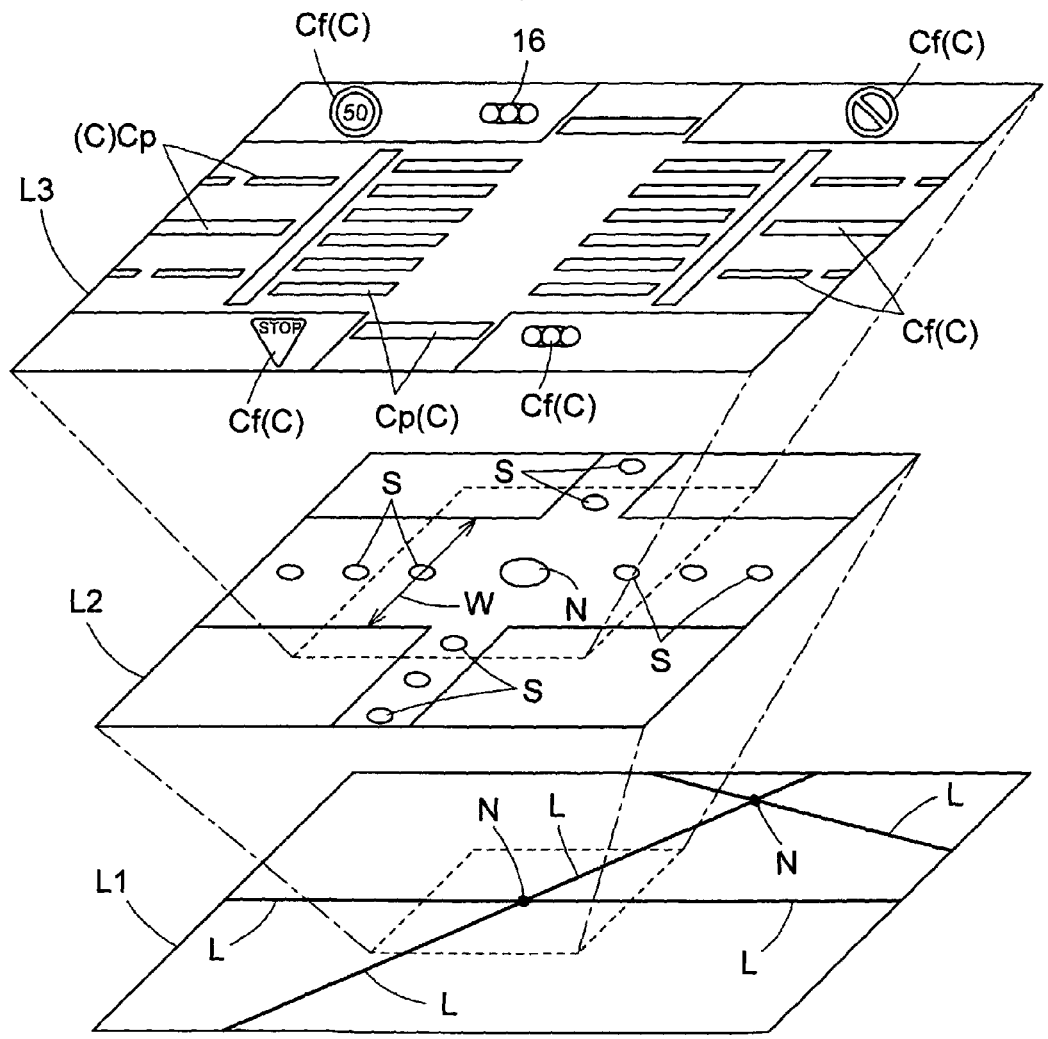
FIG. 3 is an explanatory view illustrating contents of map information stored at a map database included in the image recognizing apparatus according to the above embodiment.

The map database 8 is a database storing map information therein. FIG. 3 is a view showing exemplary contents of the map data stored in the map database 8. As shown, the map database 8 employed in this embodiment stores, as the map information, a road network layer L1, a road geometry layer L2 and a land object layer L3. This map database 8 includes, as a hardware portion thereof, a recording medium capable of storing information and its drive mechanism, such as a hard disc drive, a DVD drive having a DVD-ROM, a CD drive having a CD-ROM, etc.

The road network layer L1 indicates connection information between and among roads 11. Specifically, the connection information includes information relating to a number of nodes N containing position information on a map represented by latitude and longitude and information relating to a number of links L interconnecting a pair of nodes N to constitute each road 11. Further, each link L contains, as its link information, information relating to types of the roads 11 (road types, such as an expressway, a toll road, a national road, a prefecture road, et.), information relating to the length of the link, and so on.

The road geometry layer L2 is a layer stored in correlation with the road network layer L1 and indicates geometry of the road 11. Specifically, this layer L2 contains information relating to a number of road geometry complimenting points S arranged between pairs of nodes N (on the link) and indicating the position information represented in the terms of latitudes and longitudes and information relating to a road width W at each road geometry complementing point S.

The land object layer L3 is a layer stored in correlation with the road network layer L1 and the road geometry layer L2 and indicates information C relating to various kinds of land objects present on and around the roads 11. The land object information C stored in this land object layer L3 contains information relating to land objects which can be recognition target land objects to be used at least by this image recognizing apparatus 1.

Specifically, the land object information C stored in the land object layer L3 includes land object information Cp relating to land objects of painted markings provided on the surfaces of the roads 11, land object information Cf relating to various kinds of three-dimensional land objects such as traffic signposts, traffic signals provided along the roads 11. The painted markings include traffic marking lines (including information relating to types of marking lines such as solid lines, broken lines, double lines, etc.), zebra crossings, stop lines, pedestrian crossings, traffic lane markings designating traveling directions of respective lanes, speed markings, etc. Further, though not being "painted markings" precisely, manholes provided also on the surface of the road 11 can be included in the "painted markings" herein. The three-dimensional objects include various objects such as various kinds of traffic signposts, and traffic signals, as well as other three-dimensional objects provided along or around the road 11 such as guard rails, buildings, electric poles, billboards, etc. Hence, each type of painted markings and three-dimensional objects exemplified above corresponds to the "land object" herein. And, in this embodiment, a collection or group of land object information C for each land object are stored.

Hence, in the present embodiment, this map database 8 constitutes the "land object information storing section" in the invention.

The specific contents of the land object information C include position information, shape information, coloring information, and correlation information. Also, each land object information C includes an ID code unique to this land object information C. The position information can be information represented in terms of latitudes and longitudes. However, in the present embodiment, in order to provide this information with higher precision, the position information comprises position information on the map represented in terms of distances and directions based on the road geometry complementing points S or nodes N which per se are represented in terms of latitudes and longitudes. In addition to such two-dimensional position information as exemplified above, the position information includes also height information representing a height from the surface of the road 11. As to the position information of the three-dimensional land object information Cf, such height information is particularly important. The shape information and the coloring information are provided as information model-representing the particular shape and colorings of each land object as exemplified above.

The correlation information is information for correlating the land object information C on a plurality of land objects which are present in mutual vicinity. Specifically, the correlation information of each land object information C stores such information as ID codes representing the land object information C relating to land objects present in mutual vicinity. Some specific examples of combinations of a plurality of land objects to be correlated with each other by this correlation information are a combination of a stop line and a stop signpost, a combination of a pedestrian crossing and a stop line and/or an advance notice of a pedestrian crossing, a combination of a traffic signal and a pedestrian crossing and/or a paired another traffic signal, a combination of a zebra crossing and a traffic signal indicating road branching, a combination of traffic markings for adjacent lanes indicating respective traveling directions thereof, etc. In this regard, advantageously, this combination of a plurality of land objects comprises a combination of a two-dimensional painted making provided on the road surface and a three-dimensional object such as a traffic signpost or a traffic signal. The reason for this is as follows. Namely, a painted marking and a three-dimensional object differ from each other in the respect of conditions under which a good image thereof cannot be obtained. So, image recognition results thereof can complement each other, thus making it possible to improve the image recognition rate. In the present embodiment, as will be detailed later, at the image recognizing section 10, the selection of another recognition target land object to be used as a reference in deducing an area E (see FIG. 8) where an image of one recognition target land object is present is effected based on this correlation information. Therefore, it is preferred that the correlation information correlate such land objects having a relationship therebetween suitable for use as the basis for the deduction of such area E.

The land object information obtaining section 9 is connected with the imaging position determining section 7 and the map database 8. In operation, based on the imaging position information of the image information G outputted from the imaging position determining section 7 and the position information included in the land object information C described above, the land object information obtaining section 9 effects an operation for obtaining land object information C on one or more land objects included in an imaging area A of the image information G. More particularly, the imaging area A of the image pick-up device 2 at a certain imaging location is determined in advance, based on the on-board mounting position thereof on the vehicle M, the imaging direction, the imaging angle, etc. Hence, based on the imaging position information of the image information G, the land object information obtaining section 9 calculates an area B (see FIG. 7) corresponding to the imaging area A on the map and extracts, from the land object layer L3, all the land object information C included within this area B, based on the position information included in each land object information C.

In the above, the imaging position information of the image information G comprises values with certain amount of errors, as described hereinbefore. Therefore, preferably, the range of the area B is set greater than the range of the imaging area A by an amount greater than the errors. Further, in case the imaging area A includes a land object located distant from the imaging position as illustrated in FIG. 6 (*a*) for instance, image recognition of such distant land object is difficult. Therefore, it is preferred that land object information C on a land object present outside the range of a predetermined distance be not extracted at all.

The recognition target land object number determining section 15 effects an operation for determining, based on the land object information C obtained by the land object information obtaining section 9, whether a plurality of recognition target land objects are included within the imaging area A of the image information G or not.

In the above, a "recognition target land object" means an object which is included in the land objects whose land object information C are stored in the map database 8 and which is set as a target of image recognition by the image recognizing section 10. Whether each land object is to be set as an image recognition target or not can be set in advance, depending on e.g. the kind of each land object and stored as the contents of the land information C. In this respect, advantageously, in accordance with the particular manner of the use of the image recognition result by the image recognizing apparatus 1, such land objects which require image recognition or whose image recognitions are useful for image recognition of other land objects requiring image recognition should be set as the recognition target land objects. Needless to say, it is also possible to set all land objects whose land object information C is stored in the map database 8 as the recognition target land objects.

In the present embodiment, basically, the image recognition is effected for all land objects whose land object information C is stored in the map database 8 as the recognition target land objects. Therefore, in this embodiment, the recognition target land object number determining section 15 detects the number of the land object information C for the land objects included within the imaging area A of the image information C obtained by the land object information obtaining section 9 and if the number is found greater than 2 (two), then, it is determined that a plurality of recognition target land objects are included within the imaging area A.

Hence, in this embodiment, this recognition target land object number determining section 15 constitutes the "determining section" herein.

The image recognizing section 10 effects an image recognizing operation of each recognition target object included in the image information G. In this embodiment, the image recognizing section 10 is connected to the land object information obtaining section 9 via the image memory 14 of the image information obtaining section 3 and the recognition target land object number determining section 15. And, the image recognizing section 10 effects the recognizing operation of the image information G stored in the image memory 14, with using the land object information obtained by the land object information obtaining section 9.

More particularly, the image recognizing section 10 employed in this embodiment includes, as processing units thereof for effecting specific operations, a land object recognizing sub-section 10*a*, a land object information converting sub-section 10*b*, an area deducing sub-section 10*c* and a recognition algorithm adjusting sub-section 10*d*. The land object recognizing sub-section 10*a* effects an image recognizing operation on the recognition target land object included in the image information G. The land object information converting sub-section 10*b* effects an operation for converting the land object information C obtained by the land object information obtaining section 9 to a condition which allows comparison thereof with the image information G. The area deducing sub-section 10*c* effects an operation for deducing the area E (see FIG. 8) of presence of one recognition target land object therein within the image information G, based on result of image recognition of another recognition target land object and the position relationship between one recognition target land object and another recognition target land object based on the position information included in the land object information C, when image recognition of said one recognition target land object is to be effected. The recognition algorithm adjusting sub-section 10*d* effects an operation for adjusting a recognition algorithm used in the image recognizing operation, based on the result of deduction by the area deducing sub-section 10*c*.

The image recognizing process effected by these respective processing units of the image recognizing section 10 will be described later herein with reference to a flowchart.

Figure 4:
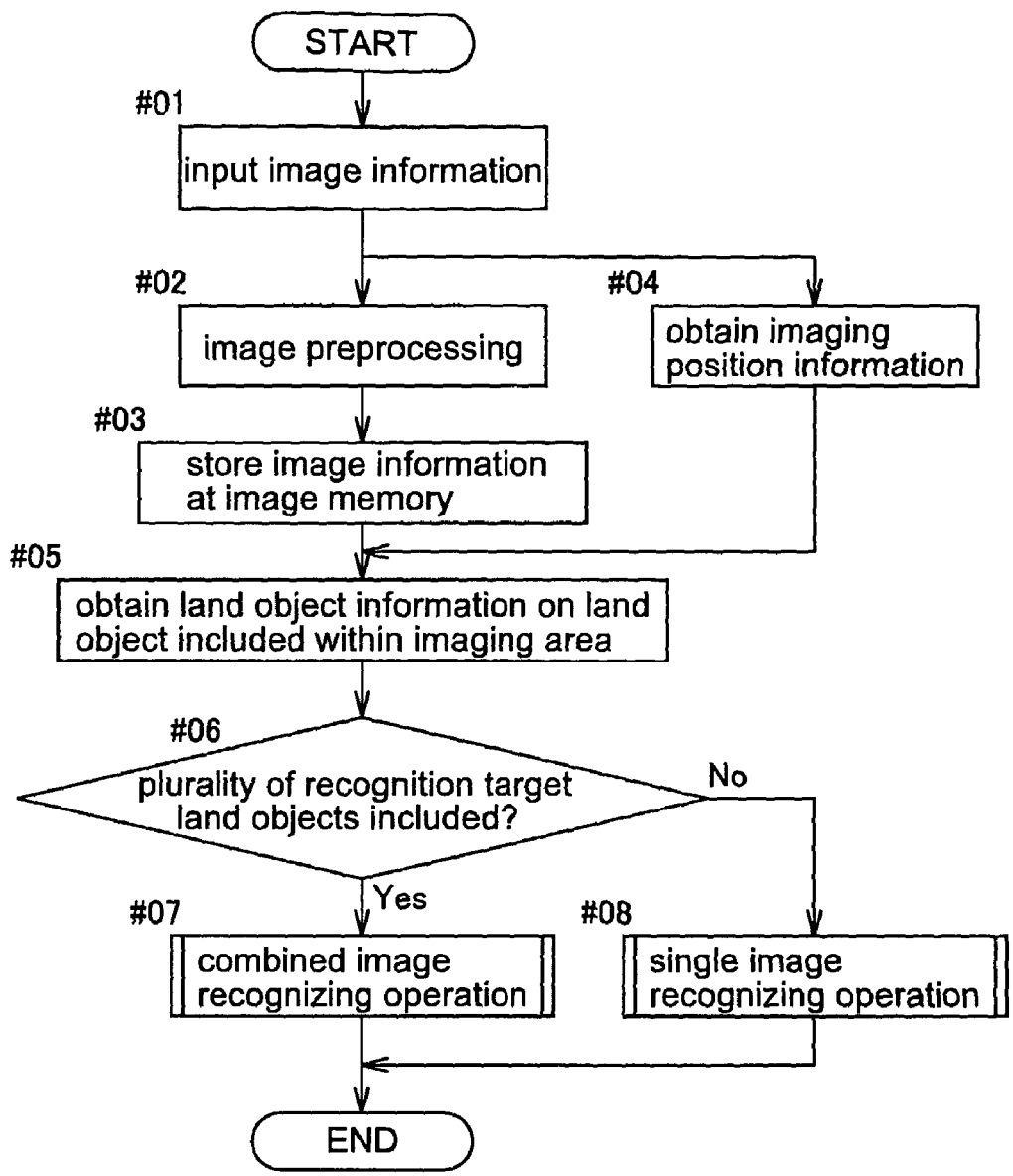
FIG. 4 is a flowchart showing the entire flow of an image recognizing process effected in the image recognizing apparatus according to the above embodiment.

Next, respective steps of the image recognizing process effected by the image recognizing apparatus 1 relating to the present embodiment will be described in details with reference to flowcharts shown in FIGS. 4 and 5. FIG. 4 is a flowchart illustrating the flow of the entire process effected by the image recognizing apparatus 1.

As shown in this FIG. 4, the image recognizing apparatus 1 first effects the operation for inputting the image information G obtained by the image pick-up device 2 (step #01). Specifically, this operation is effected for transmitting the image information G obtained by the image pick-up device 2 comprised of e.g. a on-board camera, via the interface section 12, to the image preprocessing section 13 and the image memory 14. Also, in the course of this, at the timing of the input thereto of the image information G from the image pick-up device 2, that is, at substantially same timing as the imaging (image pick-up) operation effected by the image pick-up device 2, the interface section 12 outputs a signal to the imaging position determining section 7. This signal is a signal for notifying the imaging position determining section 7 of the timing of the imaging operation effected. FIG. 6 (*a*) shows an example of the image information G (the image information G1 without undergoing the preprocessing operations) obtained by the image pick-up device 2. This particular example shows an image obtained on a road which intersects a straight road in the vicinity of a T-shaped intersection.

Having received the input of the image information G, the image preprocessing section 13 effects the preprocessing operations on the image information G (step #02). These preprocessing operations include a binarizing operation, an edge detecting operation, etc., which are effected for facilitating the image recognition by the image recognizing section 10. FIG. 6 (*b*) shows an example of the image information G (G2) after the preprocessing operations effected on the original image information G shown in FIG. 6 (*a*). In the case of the example shown in FIG. 6 (*b*), there is extracted an image showing contours of imaged objects obtained after the edge detecting operation. Then, both the image information G2 after the preprocessing operations effected at this step #02 and the original (un-preprocessed) image information G1 transmitted directly from the interface section 12 are stored in the image memory 14 (step #03).

Further, in parallel with the operations at steps #02 and #03, the imaging position determining section 7 effects the operation for determining the imaging position of the image information G (step #04). Specifically, when the signal indicative of the timing of the input of the image information G from the interface section 12, this is interpreted as the timing of the imaging operation effected by the image pick-up device 2, and the imaging position determining section 7 effects calculation for determining the imaging position, based on the outputs from the GPS receiver 4, the compass sensor 5 and the distance sensor 6. This determined imaging position is transmitted to the land object information obtaining section 9 as the imaging position information represented in terms of the latitude and the longitude. In this regard, as described hereinbefore, this imaging position information of the image information G comprise values including certain amount of errors.

Figure 7:
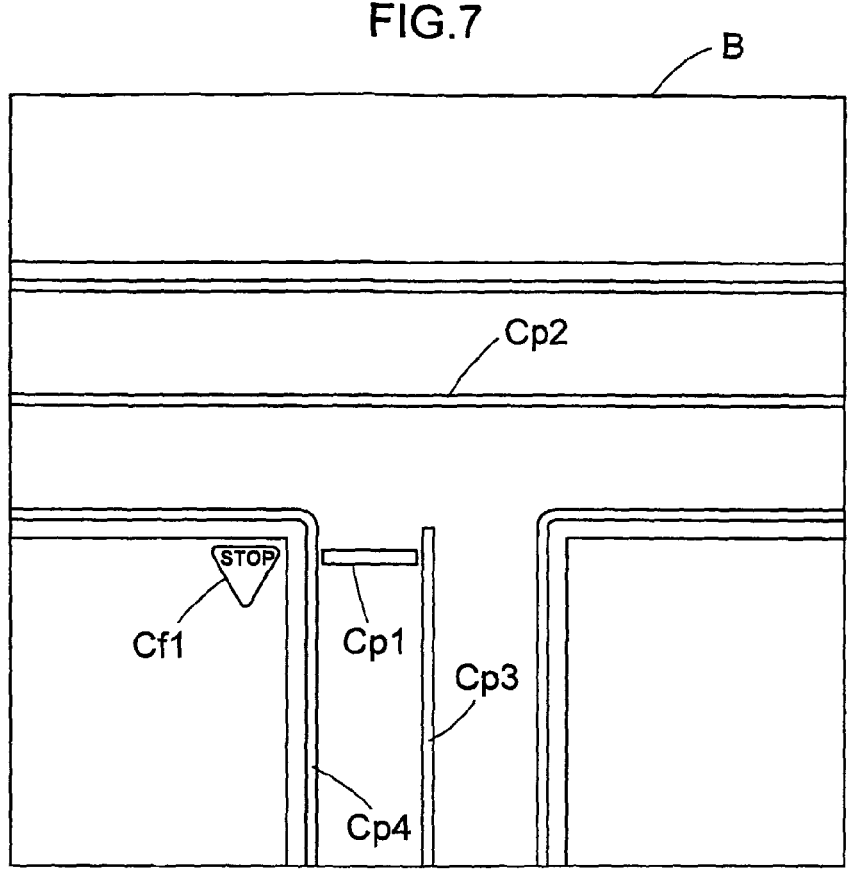
FIG. 7 shows an example of land object information obtained by a land object information obtaining section of the image recognizing apparatus according to the above embodiment.

Next, based on the imaging position information of the image information G outputted from the imaging position determining section 7 and the position information included in the land object information C, the land object information obtaining section 9 effects the operation for obtaining, from the map information stored at the map database 8, land object information on the land objects included within the imaging are a of the image information G (step #05). In the present embodiment, as shown in FIG. 7, the land object information obtaining section 9 calculates the area B corresponding substantially to the imaging area A on the map, based on the imaging position information of the image information G obtained at step #04. And, the land object information obtaining section 9 extracts and obtains all the land object information C included within this area B from the land object layer L3, based on the position information included in each land object information C. In the course of this, in consideration of the above-described errors included in the imaging position information of the image information G, the range of the area B is set to be greater than the imaging area A by the amount of the errors. Further, as image recognition of a distant land object is difficult, the range of the range B is caused not to in agreement with the range of the imaging area A and the range of the area B is set within a predetermined distance range from the imaging position.

FIG. 7 shows the land information C of the land objects included in the imaging area A of the image information G obtained by the land object information obtaining section 9 and shown in FIG. 6 (*a*) in a two-dimensional layout in accordance with the position information included in each land object information C. In the case of this example shown in FIG. 7, as the land object information C, the land object information obtaining section 9 has obtained land object information Cf1 of a stop traffic signpost as the three-dimensional object land object information Cf, and land object information Cp1 of a stop line, land object information Cp2 of a center line of a straight road extending in the right/left direction, land object information Cp3 of a center line of lanes of a road intersecting the straight road and land object information Cp4 of an outer side line of the lane of this road, etc. all as the land object information Cp on painted markings. It is understood that FIG. 7 shows just an example. The land object information obtaining section 9 actually obtains a variety of land object information C, depending on each particular imaging position of the image information G.

Next, based on the above-described land object information C obtained by the land object information obtaining section 9, the recognition target land object number determining section 15 effects the operation for determining whether a plurality of recognition target land objects are included within the imaging area A of the image information G or not (step #06). In this embodiment, specifically, the recognition target land object number determining section 15 detects the number of land object information C on the land objects included within the imaging area A of the image information G obtained by the land object information obtaining section 9. Then, if the detected number exceeds 2 (two), it is determined that a plurality of recognition target land objects are included within the imaging area A of the image information G (YES at step #06); whereas if the detected number is 1 (one), it is determined that a plurality of recognition target land objects are not included within the imaging area A of the image information G (NO at step #06).

And, in case the recognition target land object number determining section 15 has determined that a plurality of recognition target land objects are included within the imaging area A of the image information G (YES at step #06), a "combined image recognizing operation" is effected with such plural recognition target land objects being combined (step #07). In the case of the example shown in FIG. 7, as the land object information obtaining section 9 has obtained a plurality of land object information C, this combined image recognizing operation will be effected (step #08).

On the other hand, if the recognition target land object number determining section 15 has determined that a plurality of recognition target land objects are not included within the imaging area A of the image information G (NO at step #06), a "single image recognizing operation" will be effected (step #08).

Figure 5:
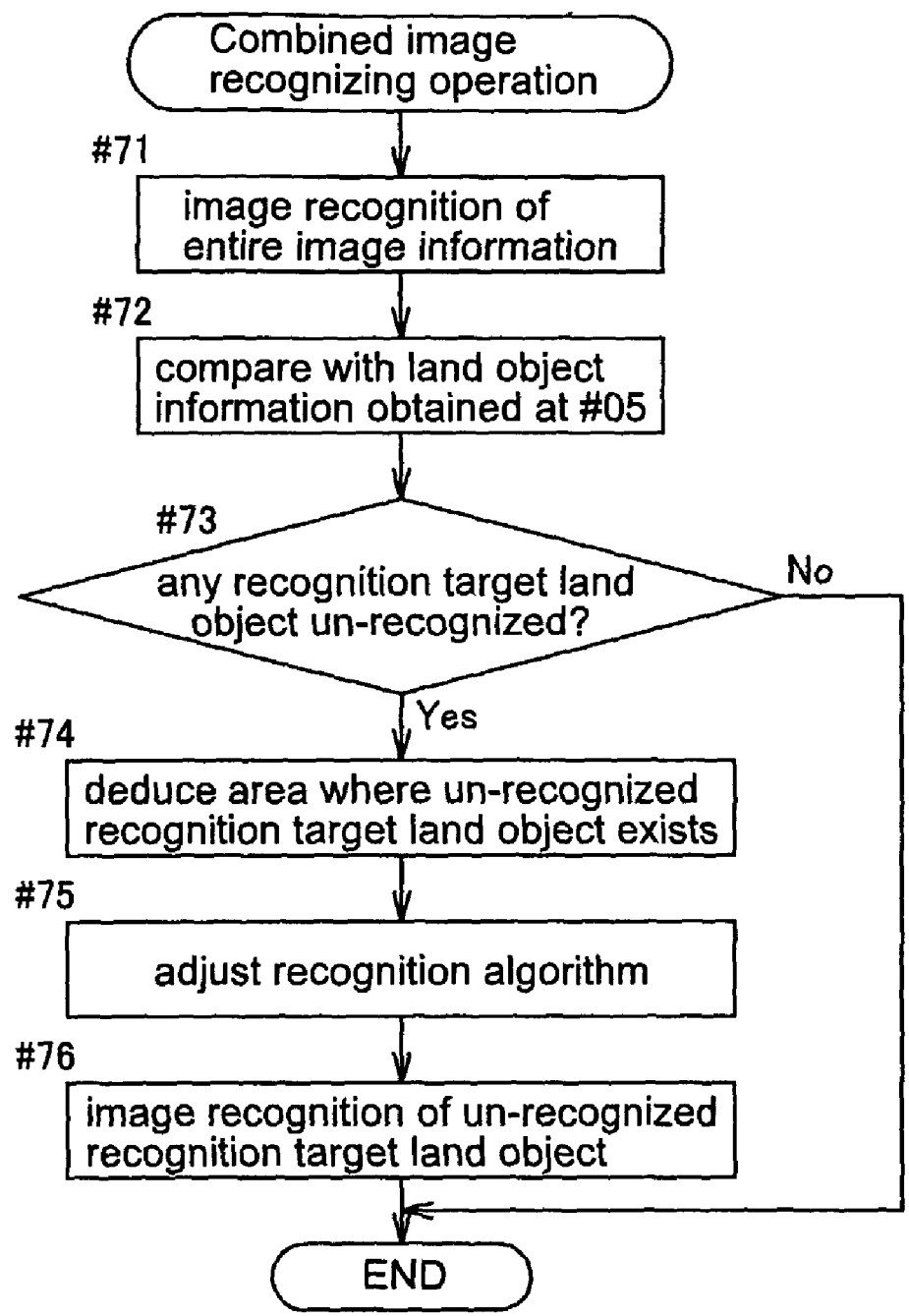
FIG. 5 is a flowchart showing the flow of a combined image recognizing process effected by an image recognizing section of the image recognizing apparatus according to the above embodiment, FIG. 6 (a) shows an example of image information obtained by an image pick-up device and FIG. 6 (b) shows an example of image information after preprocessing operations have been effected on the image information shown in FIG. 6 (a)

FIG. 5 is a flowchart illustrating the flow of the combined image recognizing process effected by the image recognizing section 10. In this combined image recognizing operation, the image recognizing section 10 effects image recognition on one recognition target land object, based on result of image recognition on another recognition target land object and the position relationship between said one recognition target land object and said another recognition target land object based on the position information included in the land object information C. Next, this process will be described in particular.

As shown in FIG. 5, in this process, first, the land object recognizing sub-section 10a effects image recognizing operations on the entire preprocessed image information G obtained at step #02 (step #71). In this, more specifically, as shown in FIG. 6 (b), the land object recognizing sub-section 10a effects a pattern matching on the entire image information G2 having undergone the preprocessing operation such as the edge detecting operation, thereby to recognize the image of each recognition target land object. In this case, in the pattern matching, there is employed e.g. a template which pre-defines characteristics data relating to a shape, coloring (brightness) of each recognition target land object, thus extracting an image having high matching with such characteristics data, then, this extracted image is recognized as the image of each recognition target land object. With this image recognizing process, it is possible to recognize an image of a recognition target land object whose image was obtained under relatively good conditions or an image of a recognition target land object such as a pedestrian crossing, a traffic signpost, etc. whose characteristics are clearly recognizable even from the image information G alone. In the example shown in FIG. 6 (b), with the image recognizing operation at this step #71, the image Gf1 of the stop traffic signpost can be recognized. For, this stop signpost image Gf1 has a distinct shape (including its painted pattern) and coloring (brightness), so that this image can be recognized relatively easily.

On the other hand, in the case of the image Gp1 of the stop line, the image Gp2 of the center line of the straight road extending in the right/left direction, the image Gp3 of the center line of lanes of the road intersecting the straight road and the image Gp4 of the outer side line of the lane of this road, the recognitions of these images are difficult from the image information G2 thereof alone. This is because while the shape and the coloring (brightness) of these images can be recognized, it remains difficult to determine which each object is which recognition target land object, based solely on the results of such image recognition. More particularly, in the case of the image Gp1 of the stop line for instance, this can be recognized as an image of a straight line longitudinal in the right/left direction. Yet, it is difficult to determine, based solely on the image information G2 thereof alone, whether this is really the stop line, the center line or the outer side line of the straight road extending in the right/left direction.

Next, the process effects the operation for comparing the result of the image recognizing operation effected at step #71 with the land object information C obtained at step #05. More particularly, each recognition target land object successfully recognized by the image recognizing operation effected at step #71 is compared with the land object information C on the recognition target land objects included within the imaging area A of the image information G obtained at step #05. And, the process determines whether the image recognizing operation at step #71 has successfully recognized the image of the recognition target land object corresponding to each land object information C.

In the present embodiment, for the above-described determination of whether the image recognition result at step #71 agrees with the land object information C or not, the land object information converting sub-section 10b converts each land object information C on the recognition target land object included within the imaging area A of the image information obtained at step #05 into a form of information which can be readily compared with the image recognition result of the image information G at step #71. Specifically, for each land object information C obtained at step #05, the land object information converting sub-section 10b calculates an "intra-image position" corresponding to the position of each recognition target land object within the image information G2, based on the imaging position information of the image information G outputted from the imaging position determining section 7 and the position information included in each land object information C. Then, the land object information converting sub-section 10b effects a layout converting operation for laying out each land object information C based on the calculated intra-image position. In this, as described hereinbefore, the imaging position information of the image information G comprises values with certain errors therein. Therefore, the above comparison is effected based on the contents of each land object information C and the position relationship of each land object information C.

If it is found, as the result of the above-described comparison effected at step #72, that the images of the recognition target land objects corresponding to the entire land object information C obtained at step #05 were successfully recognized in the image recognizing operation at step #71 (NO at step #73), the combined image recognizing process (step #07) is completed.

On the other hand, if it is found, as the result of the above-described comparison effected at step #72, that there exists a recognition target land object (referred to as "un-recognized land object" hereinafter) whose image was not successfully recognized in the image recognizing operation at step #71 (YES at step #73), then, the area deducing sub-section 10c effects the operation for deducing the area E (see FIG. 8) where this un-recognized land object exists. Specifically, the area E where this un-recognized land object exists is deduced, based on the result of the image recognition of the recognition target land object (referred to as "recognized land object" hereinafter) which was successfully recognized in the image recognizing process at step #71 and the position relationship between the un-recognized land object and one or more recognized land object based on the position information included in the land object information C.

In the present embodiment, each one of one or more un-recognized land objects corresponds to "one recognition target land object" defined herein and one or more another or other recognized land objects corresponds to "another recognition target land object" defined herein.

Figure 8:
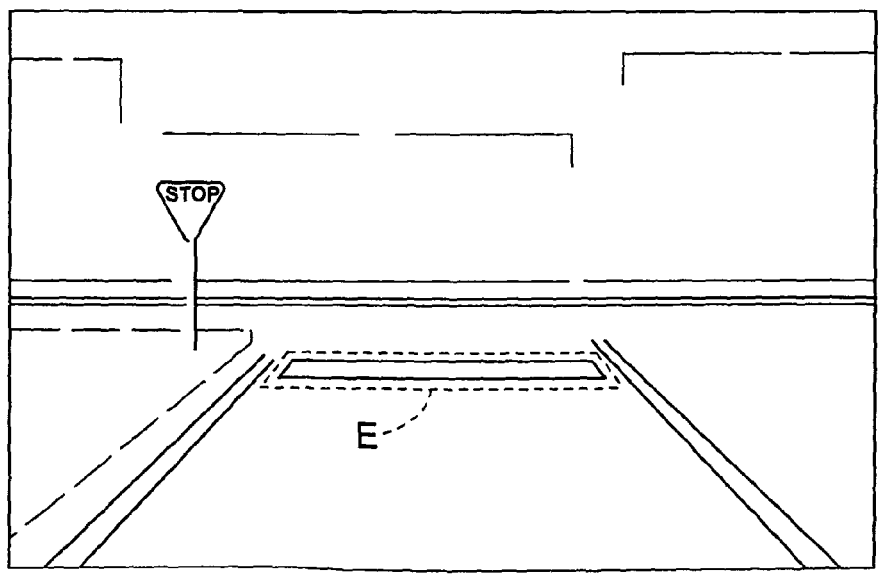
FIG. 8 is a view showing an area where an image of a stop line is deduced to be present within an image area deduced by an area deducing section of the image recognizing apparatus according to the above embodiment.

In the case of the example shown in FIG. 6 (b), as described above, the stop signpost (Gf1) is a recognized land object, whereas the stop line (Gp1), the center line of the straight road extending in the right/left direction (Gp2), the center line of lanes of the road intersecting the straight road (Gp3) and the outer side line (Gp4) are un-recognized land objects. Then, when the area where the stop line image Gp1 exists is to be deduced, for instance, this deduction is effected, based on the recognition result of the stop signpost image Gf1 as a recognized land object and the position relationship between the stop line and the stop signpost based on the position information included in the respective land object information C on the stop line and the stop signpost. Namely, if the deduction is effected based on the position information of the land object information Cp1 of the stop line and the position information of the land object information Cf1 of the stop signpost, the land object information obtaining sub-section 10b can calculate and obtain a substantially accurate position of the image Gp1 of the stop line, with reference to the position of the image Gf1 of the stop signpost within the image information C. And, the deviation in the image information G due to the errors present in the imaging position information can be resolved by using, as the reference, the position of the stop signpost image Gf1 within the image information G successfully recognized in the image recognizing process effected at step #71. Consequently, as shown in FIG. 8, the area E where the stop line image Gp1 exists within the image information G can be deduced with high precision.

In the above, if there exists a plurality of recognized land objects successfully recognized in the image recognizing process at step #71, the area deducing sub-section 10c searches for whether or not the land object information C on the un-recognized land objects contains correlation information for correlating with land object information C of another recognized land object. And, if it is found that the land object information C contains such correlation information for correlating with land object information of another recognized land object, advantageously, the image recognition result of the recognized land object corresponding to the correlated another land object information C is used preferentially for the image recognition of the un-recognized land object.

As described above, in the example shown in FIG. 6 (b), the stop signpost (Gf1) is the sole recognized land object. Hence, there occurs no problem in deciding which recognized land object image to be used as the reference in deducing the area E where the stop line image Gp1 exists. However, in general, it is believed that there is higher likelihood of a plurality of recognized land objects existing. In such case, by using, as the reference, the image or images of one or more land objects defined in advance in the correlation information as land objects suitable for the deduction of the area E where e.g. the stop line image Gp1 exists, the deduction of the area E where the stop line image Gp1 exists can be deduced with even higher precision.

Incidentally, in case there exist a plurality of recognized land objects correlated by the correlation information, it is possible to use all of these images as the reference. However, it is also possible to use a desired one image of them as the reference.

Then, after the area deducing sub-section 10c has deduced the area E where the un-recognized land object exists, the recognition algorithm adjusting sub-section 10c adjusts a recognition algorithm such that a determination threshold for determining the un-recognized land object or not may be set lower within the area E where the image of the un-recognized land object has been deduced to be present than within the other areas (step #75). And, the land object recognizing sub-section 10a effects recognition of the image of the un-recognized land object (step #76). For instance, in case image recognition within the image information G is to be effected on an un-recognized land object whose image recognition is desired, based on the degree of matching with the pre-defined characteristics data of this un-recognized land object, the recognition algorithm can be adjusted in a manner as follows. Namely, the recognition algorithm may be adjusted such that a threshold value of the matching degree with the characteristics data to determine as an un-recognized land object is set lower for the determination within the area E than the determinations within the other areas. With this, accurate image recognition is made possible even when the image information G contains therein a plurality of image "candidates" having characteristics similar to the un-recognized land object.

In the case of the example shown in FIG. 6 (b), as such image candidates for the stop line, there exist the image Gp1 and the image Gp2 both of which extend in the right/left direction forwardly of the imaging position. However, based on the area E (see FIG. 8) where the stop line was deduced to exist at step #74, the recognition algorithm adjusting sub-section 10d can adjust the recognition algorithm so that the threshold for determination whether a stop line or not is set lower within this area E than in the other areas. With this, the land object recognizing sub-section 10a can recognize that the image Gp1 is the stop line image.

Incidentally, as the method of adjusting the recognition algorithm at the recognition algorithm adjusting sub-section 10d, in addition to the above-described method of setting the determination threshold lower for the area E where an un-recognized land object is deduced to be present than for the other areas, other methods are also possible such as a method of setting the determination threshold for the other areas higher than the area E, a method of setting the threshold for the area E lower than the other areas and setting the threshold for the other areas higher at the same time. In these manners, the specific method of adjusting the recognition algorithm can be any method suitable for the method of recognizing an un-recognized land object.

The series of above-described steps at steps #01 through #08 are effected in repetition by a predetermined time interval. With this, there is realized a real-time image recognition effected simultaneously with traveling of the vehicle M.

Second Embodiment

Next, a second embodiment of the present invention will be described.

Figure 9:
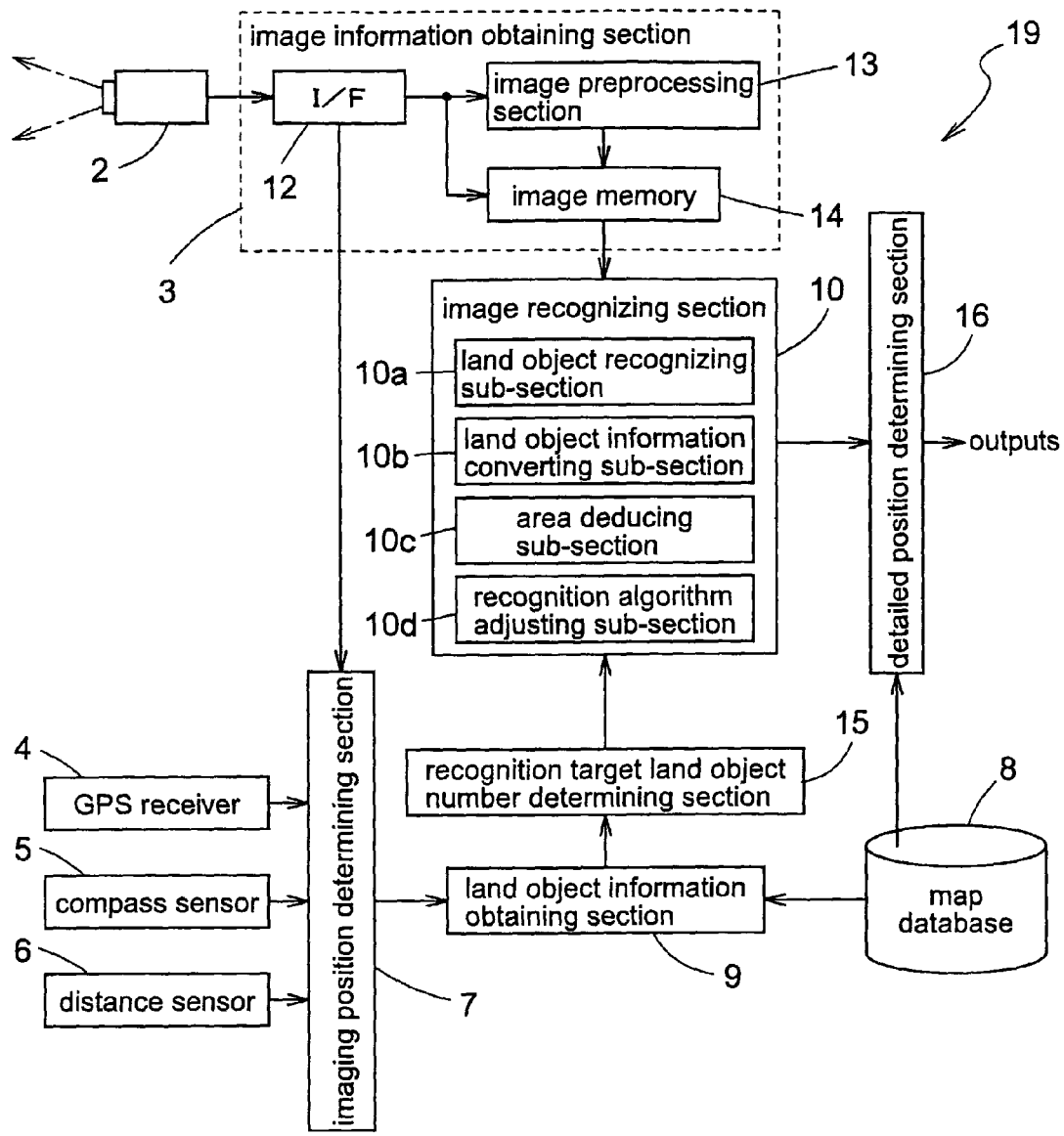
FIG. 9 is a block diagram showing a schematic construction of a position determining apparatus relating to a second embodiment of the present invention.

FIG. 9 is a block diagram showing a schematic construction of a position determining apparatus 19 relating to this embodiment. As shown, in addition to the construction of the image recognizing apparatus 1 relating to the first embodiment described above, the position determining apparatus relating to this embodiment further includes a detailed position determining section 16 for determining the imaging position of the image information G in greater details.

The detailed position determining section 16 effects an operation for determining the imaging position of the image information G, based on the result of the image recognition of the recognition target land objects by the above-described image recognizing apparatus 1 and the position information included in the land object information C on each recognized recognition target land object, in greater details than imaging position information obtained by the imaging position determining section 7 and containing certain errors.

This detailed position determining section 16 is realized in the form of hardware including an arithmetic processing unit such as a CPU as a core component thereof and/or software (program).

Next, there will be described the contents of calculating operations effected by this detailed position determining section 16. As described above, after the image recognition of the recognition target land objects contained in the image information G is completed by the image recognizing section 10, the detailed position determining section 16 effects the operation for calculating and obtaining the position relationship between each image-recognized recognition target land object within the image information G and the imaging position. This position relationship between each recognition target land object and the imaging position can be calculated, based on the layout of the image of each recognition target land object within the image information G and the mounting position and/or mounting angle of the image pick-up device 2 relative to the vehicle M.

Next, the detailed position determining section 16 obtains, from the map database 8, land object information C on each recognition target land object whose image was recognized by the image recognizing section 10. With this, there is obtained position information included in the land object information C on each recognition target land object within the image information G. This position information included in the land object information C is information indicative of correct position on the map.

And, based on the thus-obtained position relationship between each image-recognized recognition target land object within the image information G and the position information included in the land object information C on each recognition target land object, the detailed position determining section 16 effects a calculation for determining the position of the image information G with high precision on the map and then outputs the determined position as detailed imaging position information.

Further, with the position determining apparatus 19 relating to the present embodiment, when mounted on board in a vehicle M like the above-described first embodiment, the detailed imaging position information outputted from the detailed position determining section 16 becomes detailed position information of the vehicle M. Therefore, though not shown, by employing a construction in which this detailed imaging position information is inputted to a controller for controlling the travel of the vehicle M, the present invention is applicable to a vehicle controlling apparatus for controlling the travel of the vehicle M based on detailed vehicle position information.

Therefore, for instance, based on the detailed imaging position information outputted from the detailed position determining section 16 and the road geometry adjacent around the vehicle M and the various kinds of land object information C contained in the map information stored at the map database 8, the traveling control operations for the vehicle M such as steering, acceleration/decelerating operations can be effectively carried out for such purpose as keeping a traveling lane, avoidance of collision or other accidents.

Third Embodiment

Figure 10:
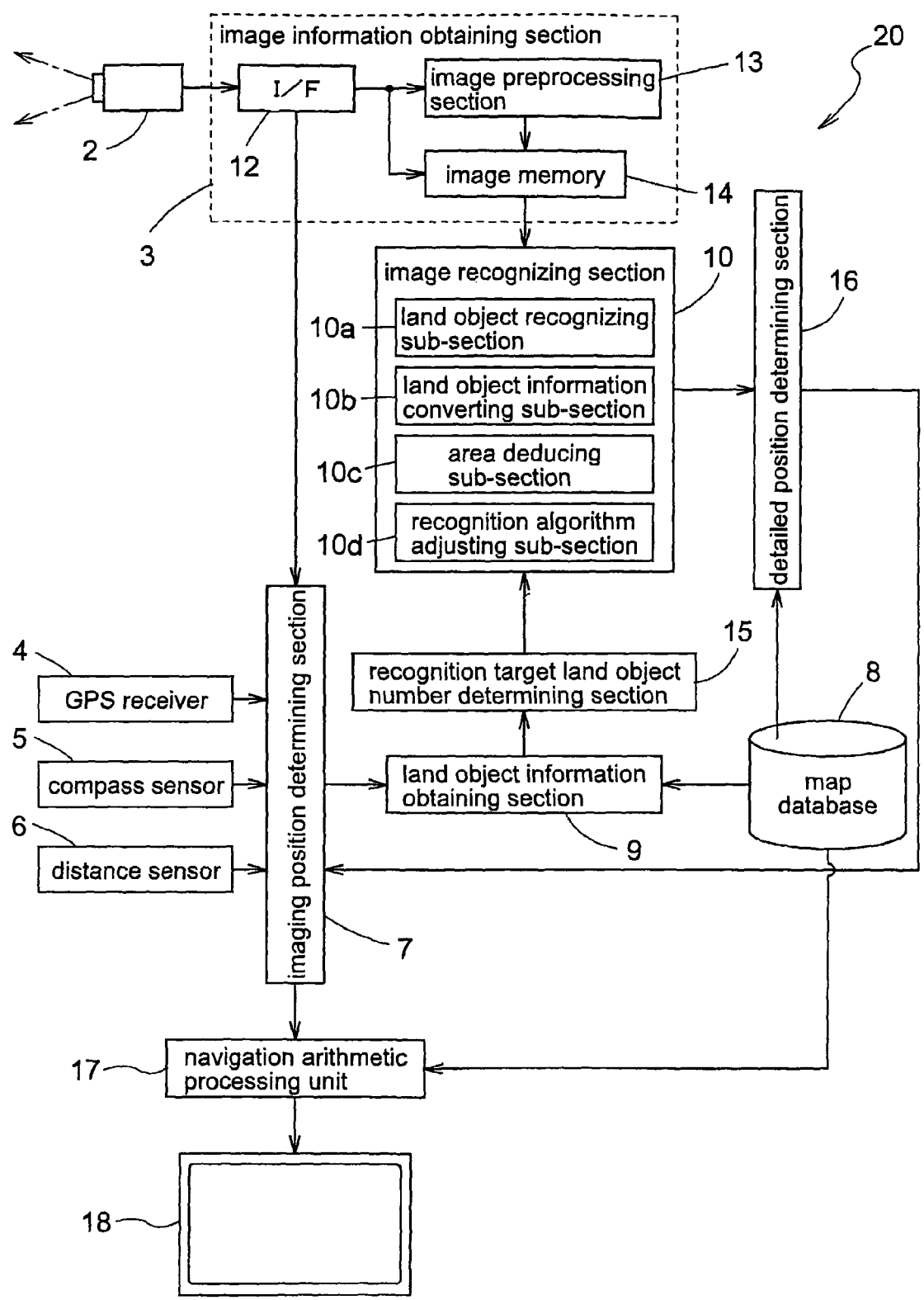
FIG. 10 is a block diagram showing a schematic construction of a navigation apparatus relating to a third embodiment of the present invention.

Next, a third embodiment of the present invention will be described. FIG. 10 is a block diagram showing a navigation apparatus 20 relating to this embodiment. As shown, in addition to the construction of the position determining apparatus 19 relating to the above-described second embodiment, the navigation apparatus 20 relating to this embodiment further includes a navigation arithmetic processing unit 17 and a displaying section 18. In this embodiment, the map database 8 corresponds to the "map information storing section" defined herein and the navigation arithmetic processing unit 17 and the displaying section 18 correspond to "a self position displaying section" as defined herein.

This navigation apparatus 20 relating to the present embodiment is constructed such that the detailed imaging position information outputted from the detailed image determining section 16 is inputted to the imaging position determining section 7. And, the imaging position determining section 7 effects an operation for correcting imaging position information obtained by means of the GPS receiver 4, the compass sensor 5, the distance sensor 6, etc, based on the detailed imaging position information. Then, the corrected imaging position information is transmitted to the navigation arithmetic processing unit 17.

Therefore, in this embodiment, this imaging position determining section 7 constitutes a "self position correcting section" herein.

The navigation arithmetic processing unit 17, based on the corrected imaging position information transmitted from the imaging position determining section 7 and using this as position information of the vehicle M, obtains map information of the vicinity of that position from the map database 8. And, on the obtained map, a figure indicative of the self vehicle position is shown in an overlapping manner and the displaying section 18 shows the self vehicle position and its vicinity map together.

Also, with such detailed determination of the self vehicle position, it becomes possible for the navigation apparatus 20 to provide detailed displaying of the self position in the unit of e.g. a traffic lane or to provide route guidance at an optimum timing based on the self position information recognized in such details.

Other Embodiments (1) In the above embodiments, the land object information C includes both the shape information and the coloring information of the land object. According to another preferred embodiment, the land object information C includes only one of these shape information and the coloring information of the land object. In this case, the image recognizing section 10 effects the image recognition of a recognition target land object with using only one of the shape information and the coloring information which is included in the land object information C.

(2) In the first through third embodiments described above, the image recognizing apparatus 1, the position determining apparatus 19 or the navigation apparatus 20 is mounted on board in the vehicle M. However, the applications of these apparatuses, i.e. the image recognizing apparatus 1, the position determining apparatus 19 and the navigation apparatus 20 are not limited such on-board application for a vehicle M. Namely, the image recognizing apparatus 1 or the like relating to the present invention can be used advantageously in case the image pick-up device 2 is moved on a road. Further, such apparatus of the invention can be used also as an apparatus for effecting image recognition of a still image obtained on the road.

Moreover, the entire construction of the image recognizing apparatus or the like of the invention need not be mounted on the vehicle M. Namely, the construction can be installed outside the vehicle M with a portion thereof excluding the image pick-up device 2 being connected via a communication network such as the Internet, such that the image recognizing apparatus 1 is constructed or realized through transmission and reception of information or signals via such network. In this case, the function of the image recognizing section 10 for instance can be executed by a server mounted outside the vehicle.

INDUSTRIAL APPLICABILITY

The image recognizing apparatus, the image recognizing method and the position determining apparatus, the vehicle controlling apparatus and the navigation apparatus using such the apparatus or the method relating to the present invention find suitable and advantageous applications for e.g. effecting image recognition of image information obtained by an image pick-up device moving on a road, such as when the apparatus is mounted on board in a vehicle.

The invention claimed is:

1. An image recognizing apparatus comprising:
an image information obtaining section for inputting image information obtained on a road;
an imaging position obtaining section for obtaining imaging position information of the image information;

a land object information storing section for storing land object information including position information of a land object;

a land object information obtaining section for obtaining, from the land object information storing section, the land object information on one or more land objects included within an imaging area of the image information, based on said imaging position information and position information included in said land object information;

a determining section for determining whether or not a plurality of recognition target land objects to be recognized are included within the imaging area of the image information, based on said land object information obtained by said land object information obtaining section; and an image recognizing section for recognizing an image of one recognition target land object, based on result of image recognition of another recognition target land object and on position relationship between said one recognition target land object and said another recognition target land object based on the position information included in said land object information, if said determining section has determined that a plurality of recognition target land objects are included.

2. The image recognizing apparatus according to claim 1, wherein when the determining section has determined that a plurality of recognition target land objects are included, said image recognizing section effects image recognition for the entire image information, compares result of this image recognition with said land object information obtained by said land object information obtaining section, then, based on success/failure of recognition of each one of the plural recognition target objects included within the imaging area of the image information, the image recognizing section sets an unrecognized land object as said one recognition target land object and a recognized land object as said another recognition target land object.

3. The image recognizing apparatus according to claim 1, wherein said land object information includes correlation information for correlating land objects located adjacent each other; and when the land object information on said one recognition target land object includes correlation information for correlating to another land object information, said image recognizing section effects the image recognition of said one recognition target land object, with using preferentially result of image recognition on said another recognition target land object corresponding to said correlated another land object information.

4. The image recognizing apparatus according to claim 1, wherein said image recognizing section includes an area deducing section for deducing an area of said one recognition target land object being present within said image information based on the result of image recognition of said another recognition target land object and on said position relationship between said one recognition target land object and said another recognition target land object based on the position information included in said land object information, and said image recognizing section effects the image recognition of said one recognition target land object based on result of said deduction.

5. The image recognizing apparatus according to claim 4, wherein the image recognizing section is configured to effect the image recognition of said one recognition target land object, with adjusting a recognition algorithm such that a determination threshold for determining said one recognition target land object or not may be set lower within an area where an image of said one recognition target land object bas been deduced to be present than within the other areas.

6. The image recognizing apparatus according to claim 1, wherein said land object information includes one or both of shape information and coloring information on the land object and said image recognizing section effects the image recognition of the recognition target land object, with using one or both of the shape information and the coloring information on the land object.

7. The image recognizing apparatus according to claim 1, wherein said land object information stored at said land object information storing section includes land object information on a painted marking provided on a road and land object information on a three-dimensional object provided along the road.

8. A position determining apparatus comprising: the image recognizing apparatus according to claim 1, wherein the position determining apparatus determines the imaging position of the image information in greater details than the imaging position information obtained by the imaging position obtaining section, based on the result of the image recognition on the recognition target land object and the position information included in the land object information on each recognized recognition target land object.

9. A vehicle controlling apparatus comprising: the image recognizing apparatus according to claim 1, wherein the vehicle controlling apparatus determines the imaging position of the image information in greater details than the imaging position information obtained by the imaging position obtaining section, based on the result of the image recognition on the recognition target land object and the position information included in the land object information on each recognized recognition target land object and then controls traveling of a vehicle, with using said determined imaging position as the current position of the vehicle.

10. A navigation apparatus comprising: the image recognizing apparatus according to claim 1; a map information storing section storing map information; a self position displaying section for displaying a self position on a map obtained from said map information storing section, and a self position correcting section for determining the imaging position of the image information in greater details than the imaging position information obtained by the imaging position obtaining section, based on the result of the image recognition on the recognition target land object and the position information included in the land object information on each recognized recognition target land object and then correcting the self position to be displayed at the self position displaying section, based on said determined imaging position.

11. An image recognizing method comprising:

an image information obtaining step for inputting image information obtained on a road;

an imaging position obtaining step for obtaining imaging position information of the image information;

a land object information storing step for storing land object information including position information of a land object;

a land object information obtaining step for obtaining, from the land object information storing step, the land object information on one or more land objects included within an imaging area of the image information, based on said imaging position information and position information included in said land object information;

a determining step for determining whether or not a plurality of recognition target land objects to be recognized are included within the imaging area of the image information, based on said land object information obtained at said land object information obtaining step; and an image recognizing step for recognizing an image of one recognition target land object, based on result of image recognition of another recognition target land object and on position relationship between said one recognition target land object and said another recognition target land object based on the position information included in said land object information, if said determining step has determined that a plurality of recognition target land objects are included.

* * * * *